United States Patent [19]
Leek, Jr.

[11] Patent Number: 5,147,532
[45] Date of Patent: Sep. 15, 1992

[54] DOMESTIC GREY WATER PURIFIER USING DIVERTER AND UV FILTER TREATER WITH PREHEATER

[76] Inventor: Kenneth F. Leek, Jr., 1973 Cordilleros, Redwood City, Calif. 94062

[21] Appl. No.: 659,607

[22] Filed: Feb. 21, 1991

[51] Int. Cl.$^5$ .............................................. B01D 36/00
[52] U.S. Cl. ...................................... 210/97; 210/136; 210/167; 210/182; 210/192; 210/257.1; 210/259; 210/335; 210/917
[58] Field of Search ................. 210/97, 136, 167, 192, 210/181, 182, 184, 257.1, 258, 259, 260, 295, 314, 416.1, 433.1, 917, 748, 170, 335; 422/24; 4/220, 222, 222.1, DIG. 9

[56] References Cited

U.S. PATENT DOCUMENTS

| | | | |
|---|---|---|---|
| 3,915,857 | 10/1975 | Olson | 210/104 |
| 3,923,663 | 12/1975 | Reid | 210/251 |
| 4,017,734 | 4/1977 | Ross | 250/431 |
| 4,101,777 | 7/1978 | Reid | 250/436 |
| 4,115,879 | 9/1978 | Toms | 210/138 |
| 4,162,218 | 7/1979 | McCormick | 210/259 |
| 4,197,597 | 4/1980 | Toms | 210/138 |
| 4,228,006 | 10/1980 | Hanna | 210/167 |
| 4,482,809 | 11/1984 | Maarschalkerweerd | 250/436 |
| 4,769,131 | 9/1988 | Noll | 210/85 |
| 4,849,100 | 7/1989 | Papandrea | 210/138 |
| 4,899,056 | 2/1990 | Ellner | 250/431 |
| 4,902,411 | 2/1990 | Lin | 210/259 |
| 4,968,437 | 11/1990 | Noll | 210/748 |
| 4,971,687 | 4/1989 | Anderson | 210/85 |
| 5,039,407 | 8/1991 | Mohrman | 210/259 |
| 5,068,030 | 11/1991 | Chen | 210/748 |

*Primary Examiner*—Robert A. Dawson
*Assistant Examiner*—Joseph Drodge
*Attorney, Agent, or Firm*—David Pressman

[57] ABSTRACT

A water purification system for treating grey water from household appliances such as baths, showers, vanity basins and washing machine (11–15) has branch-off pipes (29–33) from the usual drain pipes (17–21) these branch-off pipes lead to a storage tank tank (35). The branched off water is filtered by a screen filter (51) then circulated by a pump (53) in series to a heater (55). The system also includes a sediment filter (57), a carbon filter (59), color filter (61), an ultraviolet radiation unit (63), and hence via a shut-off valve (71), to a storage tank (73). The purified grey water can be used for car-washing, and garden and lawn irrigation. The system can be retrofited to an existing home or installed in a new home.

19 Claims, 3 Drawing Sheets

DOMESTIC GREY WATER PURIFIER USING DIVERTER AND UV FILTER TREATER WITH PREHEATER

BACKGROUND

1. Field of Invention

The present invention relates to the purification of water, in particular, to the purification of "grey" water, such as that from baths, showers, washing machines, and vanity basins.

2. Description of Prior-Art

In recent years, particularly in California, rains have not come as expected, with the result that the use of water has to be severly restricted. In particular, the use of water for such non-essential needs as washing vehicles, watering lawns and gardens, swimming pools and spas, etc., is often prohibited or severly restricted.

The liberal use of baths, long showers, and running water through vanity basins is also restricted. Users have also been required to reduce the volume of toilet flushing water by placing bricks, or other space occupying objects, in their toilet tanks. Sometimes each household is limited to 1136 liters (300 gallons) per day, which is barely enough for conservative needs.

In order to overcome water shortage problems, attempts have been made to purify used water. Some systems purify "black" water, i.e., water from dishwashers, kitchen sinks, bathroom toilets, etc. Such systems are too large and complicated for normal domestic use, and furthermore the disposal of solids which must be removed periodically from such systems presents a further undesirable disposal problem which is not provided for by any presently available service.

Other water purifiers have concentrated on purifying potable water, i.e., water which is considered safe to drink by state departments of health, but which is considered by some people to require further cleaning for safety reasons. While such systems may provide purer water, especially for drinking and cooking, they do little to reduce water consumption in general or to deal with the water shortage problem.

Still other systems have been proposed for purifying "grey" water i.e., from baths, vanity basins, and clothes washers. However, these systems have many significent drawbacks, as evidenced by the following examples.

The following four references show potable water purification systems, none of which are suitable for treating grey water due to the absence of suitable filtering, color removing, and storage systems.

T.M. Ross, U.S. Pat. No. 4,017,734, dated Apr. 12, 1977, entitled "Water Purification System Utilizing Ultraviolet Radiation";

R.A. Papandrea, U.S. Pat. No. 4,849,100, dated Jul. 18, 1989 entitled "Portable Water Purifier";

W. P. Reid, U.S. Pat. No. 4,101,777, dated Jul. 18, 1968, entitled "Fluid Purification Device and Ultraviolet Lamp Therefor" and J. R. Noll, U.S. Pat. No. 4,968,437, dated Nov. 6, 1990, entitled "Fluid Purification System".

J. Maarschalkerweerd, in U.S. Pat. No. 4,482,809, dated Nov. 13, 1984, shows an "Ultravoilet Fluid Purifying Device" used for purification of waste water. The problem with this system is that it is too large for residential use, there is no filtering or odor removing means, nor is there a heating system to provide maximum purification of water.

S. Ellner, in U.S. Pat. No. 4,899,056, dated Feb. 6, 1990, shows a "Cleaning System For Ultraviolet Light Producing Lamps". This system deals with a method of disinfecting waste water by placing modules containing ultraviolet light producing lamps within the flow of water. The lamp modules can be removed and placed in a receptable for cleaning scale therefrom. The problem here is that there is no filtering, odor, or color removing units to produce a clear, non-smelling or color-free water. Also such a system would not be practicable in residential homes.

E. Anderson, in U.S. Pat. No. 4,971,687, dated Nov. 6, 1987, shows an "Appartus For Water Treatment". This system is for the treatment of potable water, and is unable to treat grey water to the standard required for re-use for car washing or agriculture. Also it has no color removing or heating system, or water storage facilities.

J. R. Noll, in U.S. Pat. No. 4,769,131, dated Sep. 6, 1988, shows an "Ultraviolet Radiation Purification System". This system can purify potable water only and cannot be used for cleaning grey water.

W. P. Reid, U.S. Pat. No. 3,923,663, dated Dec. 2, 1975, entitled "Fluid Purification Device". Again this system cannot treat grey water and is limited to the purification of potable water.

OBJECTS AND ADVANTAGES

Accordingly, several objects and advantages of the present invention are to provide a water purification system which is economical and small enough to be used in a home, to provide a purification system that can treat grey water, and to provide a purification system which provides water for re-use, such as for washing vehicles, or irrigation for lawns and gardens, or for swimming pools.

A further object and advantage is to provide a purification system for water for re-use during times of drought, or to help stave off the effects of an oncoming drought by the early use of such a system. Also an object and advantage is to provide a very compact and easy-to-install plant that requires only about a tenth of a cubic meter (a few cubic feet) of volume and is easy to maintain and service.

It is yet another object and advantage to save at least 50 percent of water used in a private residence, to make water available for needs which would otherwise have been prohibited, and to be able to maintain landscaping so that the value of the property is not allowed to deteriorate due to a prolonged drought.

It is yet another object and advantage to provide a method to save home gardens, lawns etc. during severe water restrictions, Thus that when rains do come, resevoirs begin to refill, and restrictions are lifted, homeowners will not need to use extra water to renovate lawns and gardens, This will create an early low-level water storage in resevoirs. This will be of great benefit if another drought occurs the following year.

Further objects and advantages are to provide a water recovery system for supplying non-potable water which can adequately satisify the needs of car washing, cleaning, spas and swimming pools, irrigarion and the like in areas where drought has persisted, and also where rainfall is naturally limited, and/or where water is piped into non-rainfall areas, such as deserts, and to save costs of buying the extra water which can be saved by grey water purification. Still further objects and advantages will become apparent from a consideration of the ensuing description, taken in conjunction with the accompanying drawings.

REFERENCE NUMERALS

Figure 1:
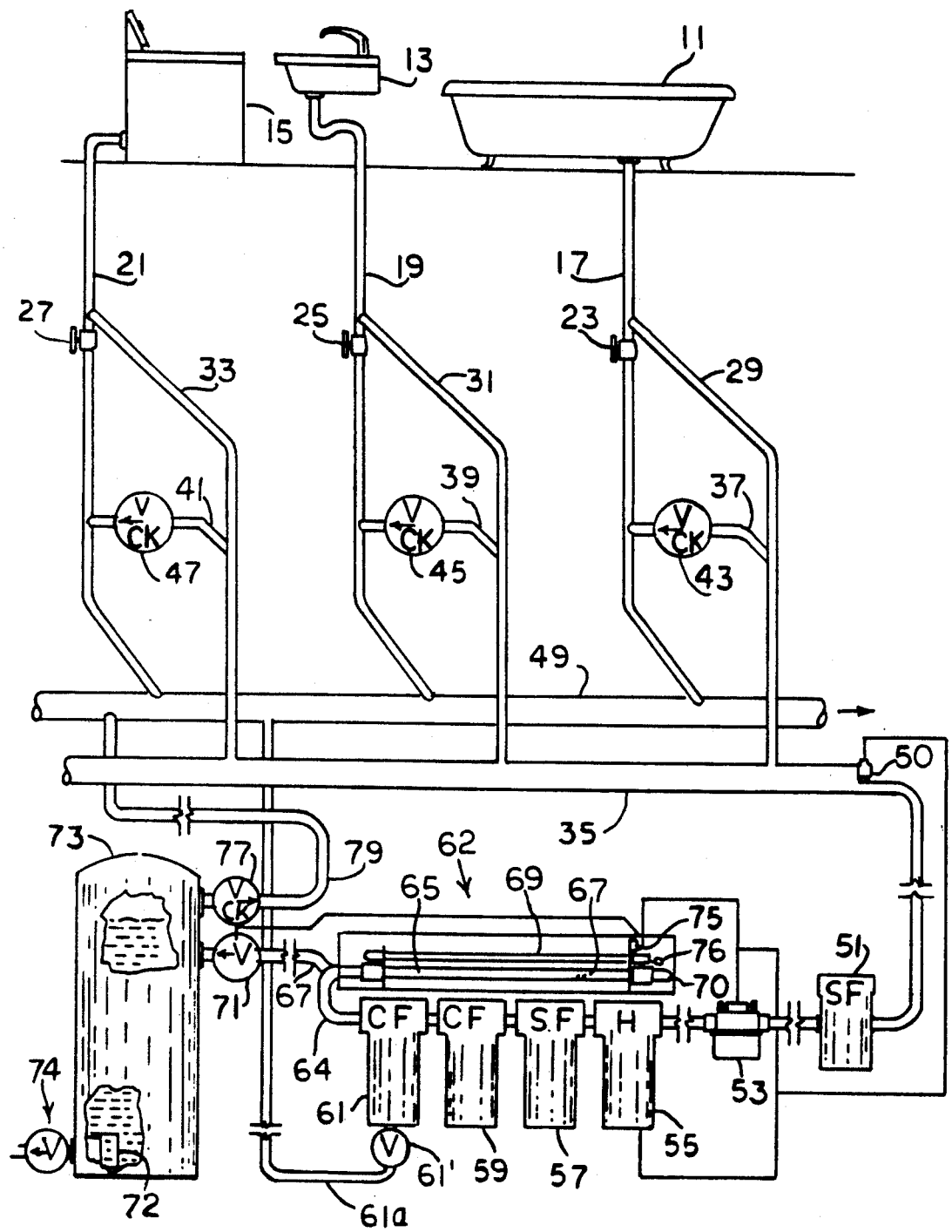
FIG. 1 is a diagramatic view of an overall system of a water purification plant for private domestic use in accordance with the invention.
Figure 2:
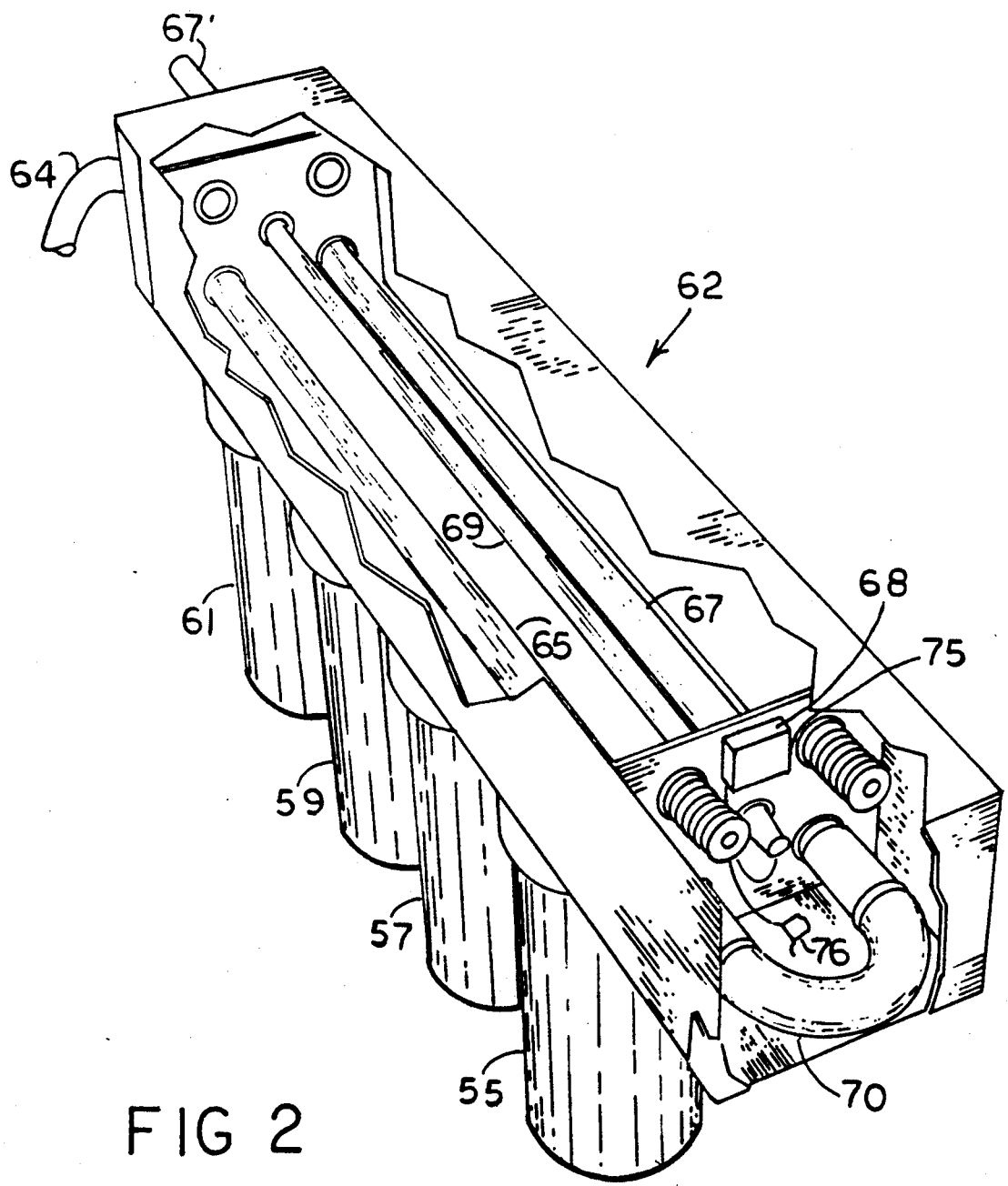
FIG. 2 is a perspective cutaway view the actual apparatus of such system.
Figure 3:
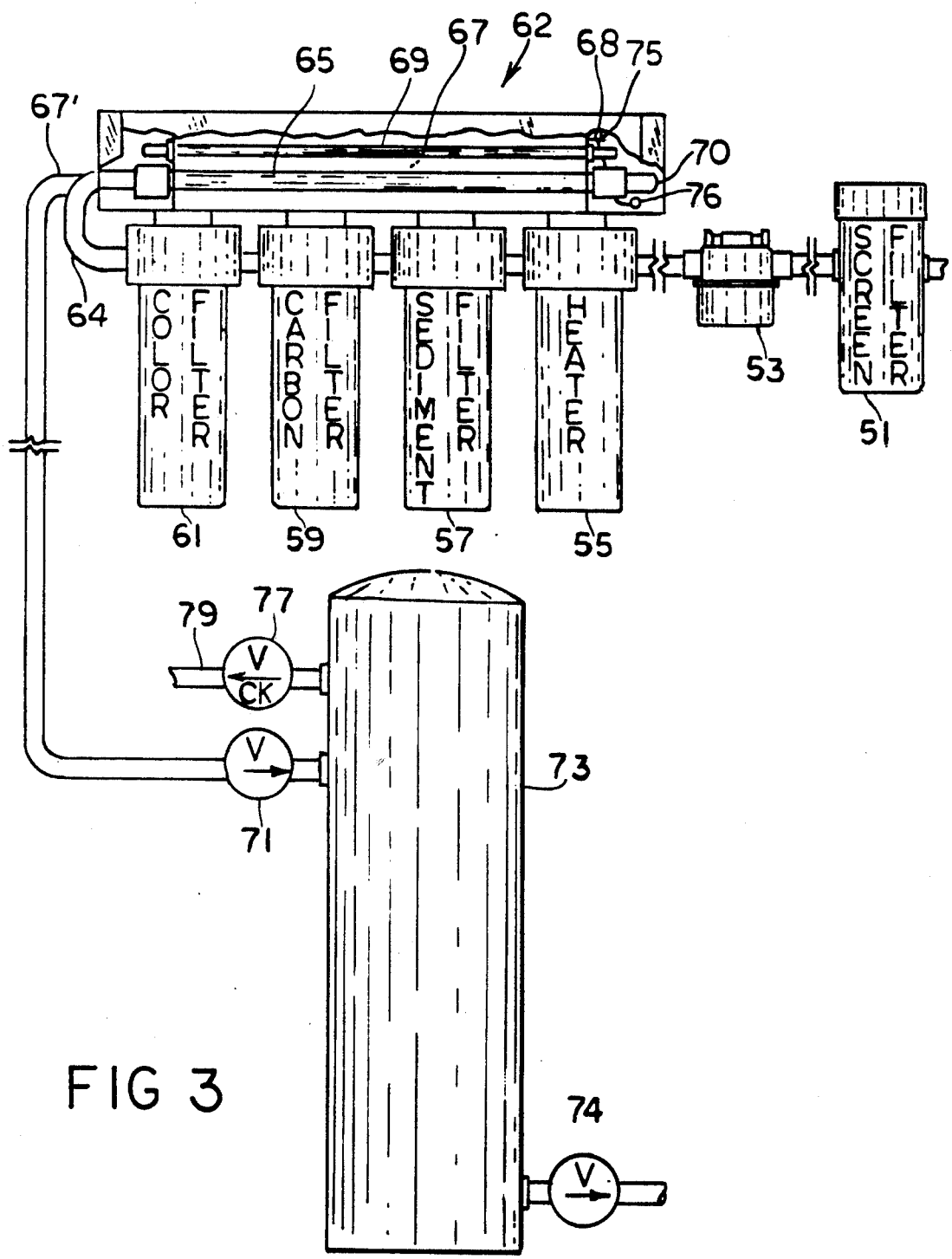
FIG. 3 is an enlarged side view of such system.

11—bath
13—vanity basin
15—clothes washer
17, 19 and 21—drain pipes
23, 25, and 27—close-off valves
29, 31 and 33—branch-off pipes
35—holding tank or pipe
37, 39, and 41—by-pass pipe
43, 45, and 47—check valves
49—sewer pipe
50—float operated switch
51—filter
53—pump
55—electric heater
57—sediment filter
59—carbon filter
61—color filter
61'—spring loaded valve
61a—return pipe
62—UV lamp assembly
64—pipe
65—side
67—side
67'—pipe
68—ballast box
69—ultraviolet lamp tube
70—bight portion
71—shut-off valve
72—submersible pump
73—storage tank
74—valve and hose
75—UV switch
76—warning light
77—check valve
79—overflow pipe Description of Grey Water Purification Plant—FIGS. 1-3)

During times of drought the need to conserve water, as resevoir levels fall, increases continuously. The need to conserve may go from mild to very severe, even to the level of disaster. In domestic homes there are three recognized categories of water usage: 1. fresh potable water, i.e., water for drinking, food preparation, health care, etc.; 2. water used for washing, bathing, showers, gardens and lawns etc., some of which becomes "grey" water after use; 3. water used to flush waste into a sewer systems, which, after use, is known as "black" water.

As stated treating black water to make it reusable is not practicable on the small scale applicable to domestic installations. I.e., black water in is not recyclable in practice. However, the present system is designed to treat grey water, particularly that from baths, showers, vanity basins, and washing machines to the degree where, although it is not considered to be potable water, or suitable for drinking, it nevertheless is quite suitable for use for car washing, irrigation, floor cleaning, swimming pools, and like uses.

FIG. 1 shows an overall diagramatic view of the system. A bath 11, which may include a shower (not shown), a vanity basin 13, and a clothes washer 15 each are fitted with drain pipes 17, 19, and 21 respectively. The drain pipes are fitted with respective close-off ball or gate valves 23, 25, and 27, which, when turned off, prevent the drain water from going straight to a sewer pipe 49.

Preceeding each of valves 23 25, and 27 are respective branch-off pipes 29, 31, and 33. Each branch-off pipe leads to a common holding tank or large holding pipe 35. Pipe or tank 35 has a capacity of about 76 liters (20 gallons), which is sufficient to hold any reasonably expected volume of grey water which the system would need to store at any one time.

Respective bypass pipes 37, 39, and 41, incorporating respective check valves 43, 45, and 47, are connected between branch-off pipes 29, 31, and 33, and drain pipes 17, 19 and 21. If holding tank 35 becomes filled to capacity, drainage from either bath 11, basin 13 or washing machine 15 will continue to drain unrestricted through a respective one of bypass pipes 37, 39, or 41, through a respective one of check valves 43, 45, or 47, into drain pipes 17, 19, and 21, and then to sewer pipe 49. Each bypass pipe has an upwardly sloping portion so that as long as tank or large pipe 35 is not filled to capacity, gravity will prevent water from pipes 28, 31, and 33 from flowing into it.

Water from tank or large pipe 35 is first fed by gravity to a float-operated mercury switch 50. Switch 50 is electrically connected from 120 VAC electric supply, (not shown) and a pump 53. When sufficient water, about 19 liters (5 gallons), enters tank 35, it lifts the float and turns on pump 53. When the water level in tank 35 drops sufficiently to about 3.8 liters (1 gallon), switch 50 turns off (open), switching off pump 53. As indicated, pump 53, is also connected electrically in parallel to electric heater 55, an ultraviolet (UV) tube 62, a UV warning system lamp 76, and an electric shut-off valve 71.

Thus heater 55, tube 62 and, light 76 turn on and valve 71 opens when pump 53 turns on. A ballast box 68 is attached to one end of UV assembly 62. A UV warning light 76 is interconnected with UV tube 69 and ballast box 68 to indicate the operating conditions within the system.

From switch 50 the water is fed (by gravity) into a screen filter 51. Filter 51 is a standard particulate filter, and consists of an inverted cup-type wire-mesh filter, for collecting particulates. It is checked about every three months for residue, then cleaned or replaced.

Pump 53 is a duplex diaphragm demand pump operated at 120 V and capable of pumping water at 3.5 Kg/cm (50 psi), or up to 15 liters (4 gallons) of water per minute. Pump 53 is preferably a diaphragm type pump. UV light 69 can also treat 15 liters per minute. If the output pressure 53 exceeds 3.5 Kg/cm, the pump will cut off, turning off the other components.

Pump 53 receives water from screen filter 51 and delivers it to an electric heater 55. Electric heater 55 is thermostatically controlled and is provided to raise the water's temperature to 32 degrees C. (about 90 degrees F.); this is the temperature at which UV light is most effective in destroying microorganisms and bacteria.

Then the water, still under pressure from pump 53, flows to a sediment filter 57. Sediment filter 57 is a standard filter, such as a 1 micron, spun wound fiberglass type. It removes foreign matter which is in suspension in the water and was able to pass screen filter 51. The filter element is replaced about each three months.

From sediment filter 57 the water flows to a carbon filter 59. Carbon filter 59 is a 5-micron carbon type filter which removes and neturalizes gases and odor from grey water. It is also serviced about every three months.

From carbon filter 59, the water flows to a DESAL Model 50, stock P3384, color filter 61, which is a reverse osmosis filter and operates best at 20 degrees C. (70 degrees F.) or above. Color filter 61 incorporates a spring-loaded valve 61', which allows some water to wash the membrane and then to escape from filter 61. This water carries away collected residue and deposit it via pipe 61a, into sewer pipe 49.

After the grey water has passed through the preceeding four filters, namely, screen filter 51, sediment filter 57, carbon filter 59 and color filter 61 (best seen in FIG. 3), it is odorless, clear, and free of particles. However, it is not free of microorganisms and bacteria.

The water now enters an UV lamp assembly 62 (FIGS. 1-3) This consists of a horizontally mounted transparent "U" tube arrangment 62 (FIG. 2), with transparent side tubes 65 and 67 which are spaced evenly along and parallel with each side of an elongated UV tube 69. Water enters from pipe 64 into tube 65, then passes along the full length of tube 65, around bight portion 70, and back along tube 67 where it enters pipe 67' before passing through an electrically operated shut-off valve 71. It then passes into a storage tank 73. The UV assembly contains a warning or pilot lamp 76 which is connected to a valve 71. If the UV lamp turns off, the pilot lamp will go out, closing valve 71, which will in turn cause pressure in the system to increase as pump 53 is still running. This increased pressure will switch pump off.

Tank 73 preferably is made of PVC, or other non-corrodable material, and has a covered top with an air vent. Tank 73 contains an electrically operated submersible pump 72, valve 74, and hose 74' to facilitate the economic use of the purified water. Tank 73 should be posted to show that its water is not suitable for drinking. Tank 73 has a capacity of 833 liters, (225 gallons).

When tank 73 fills to capacity or the level of outlet pipe 79 exccess water can escape via a check valve 77, then through pipe the 79 into sewer. Pipe check valve 77 prevents any return of water (or air) from pipe 77 to tank 73. which could contaminate the purified water within the tank.

The system shown can be retrofited in an existing home by adding all elements beyond 11, 13, 15, 17, 19, 21, and 49 below the floor, behind the walls, and in the basement, or it can be installed in a new home as it is built.

Description of Operation

The present grey water purification system is capable of treating 15 liters (4 gallons) of water per minute, i.e., about 909 liters (240 gallons) per hour. However, during prime time water usage, in a single domestic home, a large family's usage might exceed the system's processing capability. This might occur if the bath, shower, basin, and washing machine were all being emptied at the same time by different members of the family. Should this occur, storage pipe or tank 35 will be filled to capacity, and any excess water will automatically pass on through bypass pipes 37, 39, or 41, pass check valves 43, 45, or 47, and return to drain pipes 17, 19, and 21, respectively, and into sewer pipe 49.

Close-off valves 23, 25, and 27 can be opened whenever the use of the purification plant is not required or is inoperative for any reason. This will allow normal drainage from bath 11, vanity basin 13, and washer 15 to drain directly to sewer pipe 49.

While being treated at a rate of 15 liters per minute, tank 35 will be emptied in five minutes, provided no further water entered the storage pipe during that time.

When tank 73 fills to capacity, water will escape via check valve 77 and through pipe 79 to the sewer, thereby allowing additional incoming grey water from bath, basin etc. to be treated by the system.

If UV Tube Burns Out

In the event of a UV tube burning out, storage tank 73 is protected from an influx of non-sterilized water from the system by UV warning light circuit closing shut-off valve 71, thereby preventing water from entering tank 73.

However, pump 53 will continue to run, but as there is no escape for water in the system, water pressure will build up until a pressure of 3.5 Kg/cm$^2$ (50 psi), is reached. This pressure automatically switches pump off by an internal switch incorporated in the pump's circuitry. The switch of pump 53 is also connected to heater via a thermostat, therefore the heater will also be switched off. The switch of pump 53 is also connected to UV tube, so it also will be switched off. The system is now completely shut down automatically, as a result of the UV tube burning out.

When the UV tube burns out, the following sequence of events take place, namely: the tube burns out, the warning light goes out, the shut-off valve closes, the pump continues to run, water pressure builds up to 3.5 Kg/cm$^2$, the water pressure switches off the pump motor, and heater and UV circuit. (This all happens in about two seconds)

The system cannot be started again until the UV tube is replaced, and the motor of pump 53 is manually switched on again.

System Component Functions—FIG 3

The functions of the various components are as follows:

Float operated mercury switch 50 switches system on when about 19 liters (5 gallons) of grey water is available for treatment in tank 35.

Screen filter 51 collects particulates.

Electric pump 51 pumps 15 liters (2 gallons) of water per minute to system.

Electric heater 55 raises water temperature to 32 degrees C.

Sediment filter 57 removes fine particles from grey water.

Carbon filter 59 removes odor from the water.

Color filter 61 removes pigments from the water.

Spring-loaded valve 61' is incorporated in filter 61 and allows collected residue to be flushed out through pipe 61a and thence to the sewer.

UV assembly 62 kills bacteria and other microorganisms.

Shut-off valve 71 is an electrically operated valve, which opens when current is on, and closes when current is off or if the UV lamp burns out.

Tank 73 stores cleaned water.

Check valve 77 allows surplus water to escape from tank 73.

Pipe 79 delivers surplus water from tank 73 to the sewer.

Warning light 76 indicates if the UV lamp is on.

UV lamp 62 kills microorganism and bacteria

Summary, Ramifications, and Scope

Thus the reader will see that I have provided a purification system which receives grey water and turns it into clean, reusable water. Such water can be used many purposes where otherwise fresh potable water would have been used, particularly for the irrigation of lawns, and gardens, car washing, floor cleaning, etc.

There are many other uses for cleaned grey water, such as for mixing concrete, mortar, wetting down bricks before laying, swimming pools, spas and the like. In desert countries, where water is scarce or is piped in over long distances, the present systems will be an invaluable asset. In effect it can provide 50 percent more water than shows on the meter.

A very significant value of having the extra water available, especially during drought times, is that by using it to maintain the condition of gardens, lawns, and landscaping, it not only saves the high expense of revival with concomitant large use of water, but it maintains the value of the property.

An important feature also is that if enough units are deployed in a municipality, significantly higher levels of water in resevoirs will result since far less potable water will be used in such municipality.

While the above description contains many specificities, the reader should not construe these as limitations on the scope of the invention, but merely as exemplifications of preferred embodiments thereof. Those skilled in the art will envision that many other possible variations are within its scope. For example other combinations of the present components can be arranged, such as placing the pump after the heater placing the carbon filter after the color filter, using a different type of ultraviolet light assembly, etc. The first or second filter can be omitted, or the pump can be omitted if gravity can be used instead, or by makeing the system larger or smaller. Also since baby's diapers are frequently washed in washing machines, a two-way valve can be installed so that the first very soapy water can be directed into a separate sewer pipe, and the rinse waters directed to the purifying system.

Accordingly, the reader is requested to determine the scope of the invention by the appended claims and their legal equivalents, and not by the examples which have been given.

I claim:

1. A water purification system adapted for use in a home or other facility which contains at least one application which discharges grey water into a sewer system, comprising:
   means for diverting said at least one grey water discharged from said appliance,
   a grey water purifier for receiving the grey water diverted from said at least one appliance, said purifier comprising:
   at least one filter for filtering said water,
   means for heating said water, and
   ultraviolet water sterilizer means for receiving said grey water and sterilizing said grey water to provide purified grey water,
   said means for heating said water being arranged to heat said water after it is discharged from said at least one appliance and before it is supplied to said sterilizer means so as to supply heated water to said sterilizer means, and
   means for discharging said purified grey water for non-potable uses.

2. The system of claim 1, further including a holding tank arranged for storing said grey water before it is sent to said grey water purifier.

3. The system of claim 1, further including a drain pipe connecting said appliance to a sewer pipe, and wherein said means for diverting said grey water comprises a branch-off pipe connecting said drain pipe to said grey water purifier, and further including a cut-off valve in said drain pipe downstream of said branch-off pipe.

4. The system of claim 3, further including a bypass pipe connecting said branch-off pipe back to said drain pipe downstream of said cut-off valve, said bypass pipe including a check valve arranged to pass water from said branch-off pipe to said drain pipe, but not in the reverse direction, said bypass pipe having an upwardly sloping portion so that water will not normally flow from said branch-off pipe back to said drain pipe unless it cannot flow to said grey water purifier.

5. The system of claim 4, further including a holding tank arranged for storing said grey water before it it sent to said grey water purifier.

6. The system of claim 1, wherein said at least one filler includes a means for carbon filtering said water.

7. The system of claim 6, second filter means for filtering finer particles from said water than are filtered by said means for carbon filtering.

8. The system of claim 7 wherein said at least one filter includes a color filter means for filtering pigments from said water.

9. The system of claim 1, said grey water purifier further including pump means for pumping said at least one grey water through said filter and said sterilizer means.

10. The system of claim 9, further including a holding tank for storing said grey water before it it sent to said grey water purifier, and said grey water purifier further including a level switch for actuating said pump if the level of grey water in said holding tank reaches a predetermined level.

11. The system of claim 1, said grey water purifier further including a storage tank arranged for storing said purified grey water.

12. The system of claim 11, further including a holding tank arranged for storing said grey water before it it sent to said grey water purifier.

13. The system of claim 1, further including a holding tank arranged for storing said grey water before it it sent to said grey water purifier, pump means for pumping said grey water through said at least one filter and said sterilizer means, and a level switch for actuating said pump and said sterilizer means, if the level of grey water in said holding tank reaches a predetermined level.

14. The system of claim 13, further including a drain pipe connecting said appliance to a sewer pipe, and wherein said means for diverting said grey water comprises a branch-off pipe connecting said drain pipe to said grey water purifier, and further including a cut-off valve in said drain pipe downstream of said branch-off pipe.

15. The system of claim 14, further including a bypass pipe connecting said branch-off pipe back to said drain pipe downstream of said cut-off valve, said bypass pipe including a check valve arranged to pass water from said branch-off pipe to said drain pipe, but not in the reverse direction, said bypass pipe having an upwardly sloping portion so that water will not normally flow from said branch-off pipe back to said drain pipe unless it cannot flow to said grey water purifier.

16. A water purification system adapted for use in a home or other facility which contains at least one appliance which discharges grey water into a sewer system, comprising:

means for diverting said at least one grey water discharged from said appliance a grey water purifier for receiving the grey water diverted from said at least one appliance, said purifier comprising:

at least one filter for filtering said water, means for heating said water, and an ultraviolet water sterilizer means for receiving said grey water and sterilizing said grey water to provide purified grey water, said means for heating said water being arranged to heat said water after it is discharged from said at least one appliance and before it is supplied to said sterilizer means, so as to supply heated water to said sterilizer means, and means for discharging said purified grey water for non-potable uses, and means for connecting said at least one appliance to a sewer pipe by a drain pipe, said means for diverting said grey water comprising a branch-off pipe connecting said drain pipe to said grey water purifier and a cut-off valve in said drain pipe downstream of said branch-off pipe.

17. The water purification system of claim 16, wherein said at least one filter includes a second filter means for filtering finer particles from said water than are filtered by a first upstream filter, color filter means for filtering pigments from said water, and said system further includes a bypass pipe connecting said branch-off pipe back to said drain pipe downstream of said cut-off valve, said bypass pipe including a check valve arranged to pass water from said branch-off pipe to said drain pipe, but not in the reverse direction, said bypass pipe having an upwardly sloping portion so that water will not normally flow from said branch-off pipe back to said drain pipe unless it cannot flow to said grey water purifier.

18. The system of claim 17, wherein said at least one filter includes means for carbon filtering said water.

19. A water purification system adapted for use in a home or other facility which contains at least one appliance which discharges grey water into a sewer system, comprising:

means for diverting said grey water discharged from said at least one appliance, a grey water purifier for receiving the grey water diverted from said at least one appliance, said purifier comprising at least one filter for filtering said water, and an ultraviolet water sterilizer means for receiving said grey water and sterilizing said grey water to provide purified grey water, means for discharging said purified grey water for non-potable uses, and means for connecting said at least one appliance to a sewer pipe by a drain pipe, said means for diverting said grey water comprising a branch-off pipe connecting said drain pipe to said grey water purifier a cut-off valve in said drain pipe downstream of said branch-off pipe, and a bypass pipe connecting said branch-off pipe back to said drain pipe downstream of said cut-off valve, said bypass pipe including a check valve arranged to pass water from said branch-off pipe to said drain pipe, but not in the reverse direction, said bypass pipe having an upwardly sloping portion so that water will not normally flow from said branch-off pipe back to said drain pipe unless it cannot flow to said grey water purifier.

* * * * *

UNITED STATES PATENT AND TRADEMARK OFFICE
CERTIFICATE OF CORRECTION

PATENT NO. : 5,147,532
DATED : Sep. 15, 1992
INVENTOR(S) : Kenneth F. Leek, Jr.

It is certified that error appears in the above-indentified patent and that said Letters Patent is hereby corrected as shown below:

Col. 7, lines 5-6, "means for diverting said at least one grey water discharged from said appliance," should read --means for diverting said grey water discharged from said at least one appliance,--

Col. 8, lines 2-3, "said at least one grey water through said filter" should read --said grey water through said at least one filter--

Col. 9, lines 5-6, "means for diverting said at least one grey water discharged from said appliance," should read --means for diverting said grey water discharged from said at least one appliance,--

Signed and Sealed this

Twelfth Day of April, 1994

BRUCE LEHMAN

*Attest:*

*Attesting Officer*

Commissioner of Patents and Trademarks